United States Patent
Panahpour Tehrani et al.

(10) Patent No.: US 8,204,316 B2
(45) Date of Patent: Jun. 19, 2012

(54) APPARATUS, METHOD AND COMPUTER PROGRAM FOR CLASSIFYING PIXELS IN A MOTION PICTURE AS FOREGROUND OR BACKGROUND

(75) Inventors: Mehrdad Panahpour Tehrani, Saitama (JP); Akio Ishikawa, Saitama (JP); Shigeyuki Sakazawa, Saitama (JP)

(73) Assignee: KDDI Corporation, Tokyo (JP)

( * ) Notice: Subject to any disclaimer, the term of this patent is extended or adjusted under 35 U.S.C. 154(b) by 924 days.

(21) Appl. No.: 12/240,467

(22) Filed: Sep. 29, 2008

(65) Prior Publication Data
US 2009/0110299 A1    Apr. 30, 2009

(30) Foreign Application Priority Data

Oct. 30, 2007    (JP) .................................. 2007-281538

(51) Int. Cl.
G06K 9/34    (2006.01)
G06K 9/62    (2006.01)
(52) U.S. Cl. ........................................ 382/224; 382/173
(58) Field of Classification Search ................. None
See application file for complete search history.

(56) References Cited

U.S. PATENT DOCUMENTS

| | | | |
|---|---|---|---|
| 2002/0037103 A1* | 3/2002 | Hong et al. | 382/173 |
| 2004/0001624 A1* | 1/2004 | Curry et al. | 382/173 |
| 2004/0114799 A1* | 6/2004 | Xu | 382/173 |
| 2006/0170769 A1* | 8/2006 | Zhou | 348/143 |
| 2007/0195993 A1* | 8/2007 | Chen et al. | 382/103 |
| 2008/0181499 A1* | 7/2008 | Yang et al. | 382/174 |
| 2008/0247647 A1* | 10/2008 | King | 382/173 |
| 2009/0087096 A1* | 4/2009 | Eaton et al. | 382/190 |

FOREIGN PATENT DOCUMENTS

JP    A-2000-251079    9/2000

OTHER PUBLICATIONS

Kamkar-Parsi et al. "A multi-criteria model for robust foreground extraction", VSSN 2005.*
Gutchess D. et al. "A background model initialization algorithm for video surveillance", Eighth IEEE International Conference on Computer Vision, 2001.*
Horprasert et al. "A Statistical Approach for Real-time Robust Background Subtraction and Shadow Detection" Proceedings of the IEEE, Frame-Rate Application Workshop, Greece, 1999.
Satoh et al. "Robust Background Subtraction based on Bi-polar Radial Reach Correlation" TENCON 2005, IEEE Region 10, Nov. 2005.
Elgammal et al. "Background and Foreground Modeling Using Nonparametric Kernel Density Estimation for Visual Surveillance" Proceedings of the IEEE, Vo. 90, No. 7, Jul. 2002.
Office Action issued in Japanese Patent Appln. No. 2007-281538; mailed Mar. 27, 2012, with translation.

* cited by examiner

Primary Examiner — Li Liu
(74) Attorney, Agent, or Firm — Oliff & Berridge, PLC (57) ABSTRACT

The present invention relates to an apparatus and a method for classifying pixels in each frame of a motion picture as foreground or background. According to the invention, the apparatus has a decision unit and adjustment unit. The decision unit classifies a pixel as a foreground pixel, a background pixel or an undefined pixel based on a first threshold, a second threshold and a distribution value of the pixel representing an occurrence probability of a pixel value of the pixel. The decision unit sorts each pixel into a foreground pixel or a background pixel based on the classification result of the decision unit.

8 Claims, 9 Drawing Sheets

| 1 | 2 | 3 | W |
|---|---|---|---|
| F=6<br>U=6<br>B=4 | F=7<br>U=6<br>B=3 | F=8<br>U=4<br>B=4 | F=5<br>U=3<br>B=8 |
|  | ΔF=+1<br>ΔU=0<br>ΔB=−1 | ΔF=+1<br>ΔU=−2<br>ΔB=+1 | ΔF=+1<br>ΔU=+1<br>ΔB=0 |

Fig. 4

| Th1=0.2<br>Th2=0.4 | Th1=0.2<br>Th2=0.4 | Th1=0.2<br>Th2=0.5 | |
|---|---|---|---|
| 1 | 2 | 3 | W |
| F=6<br>U=6<br>B=4 | F=7<br>U=6<br>B=3 | F=8<br>U=5<br>B=3 | F=5<br>U=3<br>B=8 |
|  | ΔF=+1<br>ΔU=0<br>ΔB=−1 | ΔF=+1<br>ΔU=−1<br>ΔB=+0 | ΔF=+1<br>ΔU=+1<br>ΔB=0 |

Fig. 5

$P_L(F) < Th3 < P_s(B) \rightarrow$ SORTING THE PIXEL 10 INTO "B"

$P_L(B) < Th4 < P_s(F) \rightarrow$ SORTING THE PIXEL 10 INTO "F"

$P_L(F)$: THE RATIO OF FOREGROUND PIXELS TO ALL PIXELS WITHIN THE CIRCLE 11

$P_s(F)$: THE RATIO OF FOREGROUND PIXELS TO ALL PIXELS WITHIN THE CIRCLE 12

$P_L(B)$: THE RATIO OF BACKGROUND PIXELS TO ALL PIXELS WITHIN THE CIRCLE 11

$P_s(B)$: THE RATIO OF BACKGROUND PIXELS TO ALL PIXELS WITHIN THE CIRCLE 12

APPARATUS, METHOD AND COMPUTER PROGRAM FOR CLASSIFYING PIXELS IN A MOTION PICTURE AS FOREGROUND OR BACKGROUND

PRIORITY CLAIM

This application claims priority from Japanese patent application No. 2007-281538 filed on Oct. 30, 2007, which are incorporated herein by reference.

BACKGROUND OF THE INVENTION

1. Field of the Invention

The present invention relates to an apparatus and a method for classifying pixels in each frame of a motion picture as foreground or background.

2. Description of the Related Art

In order to monitor moving objects such as people, animals, vehicles and so on, in a moving picture for a surveillance system, a traffic measurement system or a video conference system, it is required to distinguish moving objects from other fixed objects, such as buildings, roads, trees, walls, and various equipment. In other word, it is required to determine whether each pixel in each frame of the moving picture corresponds to a moving object or a fixed object. Hereinafter, moving objects to be distinguished are referred as foreground, and reaming parts are referred as background. Further, a pixel corresponding to foreground is referred as a foreground pixel, and a pixel corresponding to background is referred as a background pixel.

Thanarat Horprasert, et al. "A Statistical Approach for Real-time Robust Background Subtraction and Shadow Detection", Proc. IEEE, Frame-Rate Application Workshop, Greece, 1999 and Yutaka Satoh, et al. "Robust Background Subtraction based on Bi-polar Radial Reach Correlation", TENCON 2005, IEEE Region 10, November 2005 disclose a method for determining a pixel type, i.e. foreground or background, based on a reference image, which is a background image or video captured in advance. However, in case background colors are changed due to light or the like while capturing the moving picture, the method is not applicable. Further, in case background colors and foreground colors are similar, it is hard to distinguish them, and accuracy of determination becomes poor.

On the other hand, Ahmed Elgammal, et al. "Background and Foreground Modeling Using Nonparametric Kernel Density Estimation for Visual Surveillance", Proc. of IEEE, Vol. 90, No. 7, July 2002, discloses a method which generates a statistical model of pixel values from frames of a moving picture, and classifies pixels using the statistical model and a threshold value.

The method uses a fixed threshold value to determine a pixel type of each pixel. Therefore, the result is very sensitive to the threshold value. For example, in case a shadow produced by foreground objects has a color similar to that of a background object, pixels in the shadow area are classified as background with a given threshold value, while they are classified as foreground with a threshold value, which is slightly different from the given threshold value. Thus, a different result arises according to a threshold value to be used.

The problem of the method is that it is sensitive to bright colors and camera characteristics. Therefore, in a region where the background has a high-frequency border, the method is not sufficient for an application, which requires high detection accuracy. When the background has very high-frequency dispersion, the model cannot achieve highly sensitive detection. If the model is generated with small numbers of Gaussian distribution, an accurate result cannot be obtained.

SUMMARY OF THE INVENTION

Accordingly, it is an object of the present invention to provide an apparatus and method for classifying pixels of a motion picture as foreground or background more accurately than conventional techniques. Further it is also an object of the present invention to provide a program, which enables a computer to function as the apparatus.

According to the invention, an apparatus for classifying pixels in each frame of a motion picture as foreground or background has a distribution generating unit, a decision unit and an adjustment unit. The distribution generating units generates a distribution value for a pixel representing an occurrence probability of a pixel value of the pixel based on pixel values of pixels located at the same position in each frame as the pixel. Then, the decision unit classifies a pixel as a foreground pixel, a background pixel or an undefined pixel based on a first threshold, a second threshold and the distribution value of the pixel. Finally, the adjustment unit sorts each pixel into a foreground pixel or a background pixel based on the classification result of the decision unit.

Preferably, the decision units classifies pixels of each frame based on the first and second thresholds as foreground, background or undefined, divides each frame to blocks, calculates differences of the number of pixels in the same class in a block between adjacent frames, updates the first and/or second thresholds for the block based on the differences, and reclassifies pixels in the block when the first and/or second thresholds for the block are updated.

Advantageously, the decision unit calculates mean values and standard deviations of differences of the number of a first and a second pixels in a block between adjacent frames, calculates a first and a second allowable ranges for the block based on the calculated mean values and the standard deviations, and updating the first and/or second thresholds for the block in case the difference of the first pixel in the block from a previous frame is not within the first allowable range or the difference of the second pixel in the block from a previous frame is not within the second allowable range. Here, the first and second pixels are foreground pixels, background pixels or undefined pixels.

It is preferable that the adjustment unit sorts an undefined pixel into foreground, background or undefined based on the number of foreground pixels and background pixels in a region centered at the undefined pixel as well as a distributions of foreground pixels and background pixels in the region, and repeats the sorting by changing the size of the region.

Favorably, the adjustment unit determines a region, in which a ratio of a difference between foreground pixels and background pixels to a sum of foreground pixels and background pixels is less than a third threshold, and sorts an undefined pixel into foreground, background or undefined based on a mean value and a standard deviation of pixel values of the undefined pixel over frames, a mean value and a standard deviation of pixel values of foreground pixels in the region over the frames, a mean value and a standard deviation of pixel values of background pixels in the region over the frames, a physical distance between the undefined pixel and foreground pixels in the region and a physical distance between the undefined pixel and background pixels in the region.

Further, it is preferable that the adjustment units changes undefined pixels to foreground pixels or background pixels, changes a foreground pixel to a background pixel if a ratio of the number of background pixels to all pixels in a region including the foreground pixel is more than a fourth threshold, and vice versa.

Advantageously, the distribution generating unit determines a standard deviation of a group of pixels, each of which is located at the same position of frames, based on pixel values of the group of pixels, generates a distribution corresponding to a pixel of the group, where a standard deviation of the distribution is equal to the determined standard deviation of the group of pixels and a mean value of the distribution is equal to a pixel value of a corresponding pixel, and generates a kernel distribution for the group by summing up each distribution corresponding to a pixel of the group. The distribution generating unit generates the distribution value for a pixel of the group by substituting a pixel value of the pixel of the group to the kernel distribution for the group.

According to the invention, a method for classifying pixels in each frame of a motion picture as foreground or background has the steps of generating a distribution value for a pixel representing an occurrence probability of a pixel value of the pixel based on pixel values of pixels located at the same position in each frame as the pixel, classifying a pixel as a foreground pixel, a background pixel or an undefined pixel based on a first threshold, a second threshold and the distribution value of the pixel, and sorting each pixel into a foreground pixel or a background pixel based on the classification result of the classifying step.

Favorably, the classifying steps has the steps of classifying pixels of each frame based on the first and second thresholds as foreground, background or undefined, updating the first and/or second thresholds based on the classification result, and reclassifying pixels based on the updated first and second thresholds.

According to the invention, a computer program, which makes a computer function as the apparatus, is provided. Further, a computer readable medium including the computer program is also provided.

Further objects and advantages of the present invention will be apparent from the following description of the preferred embodiments of the invention as illustrated in the accompanying drawings.

DETAILED DESCRIPTION OF THE INVENTION

Figure 1:
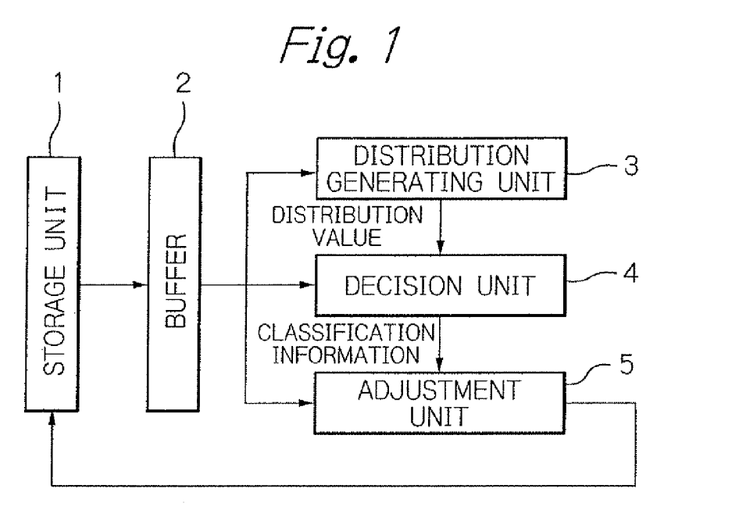
FIG. 1 is a block diagram of an apparatus according to the invention.

FIG. 1 is a block diagram of an apparatus, which determines a pixel type, i.e. foreground or background, of pixels in each frame of a moving picture according to the invention. As shown in FIG. 1, the apparatus has a storage unit 1, a buffer 2, a distribution generating unit 3, a decision unit 4 and an adjustment unit 5. The apparatus performs the classification by W frames. With this reason, the buffer 2 reads out W frames stored in the storage unit 1, and the distribution generating unit 3, the decision unit 4 and the adjustment unit 5 determine a pixel type of each pixel included in W frames stored in the buffer 2, and store processed W frames into the storage unit 1.

Figure 6:
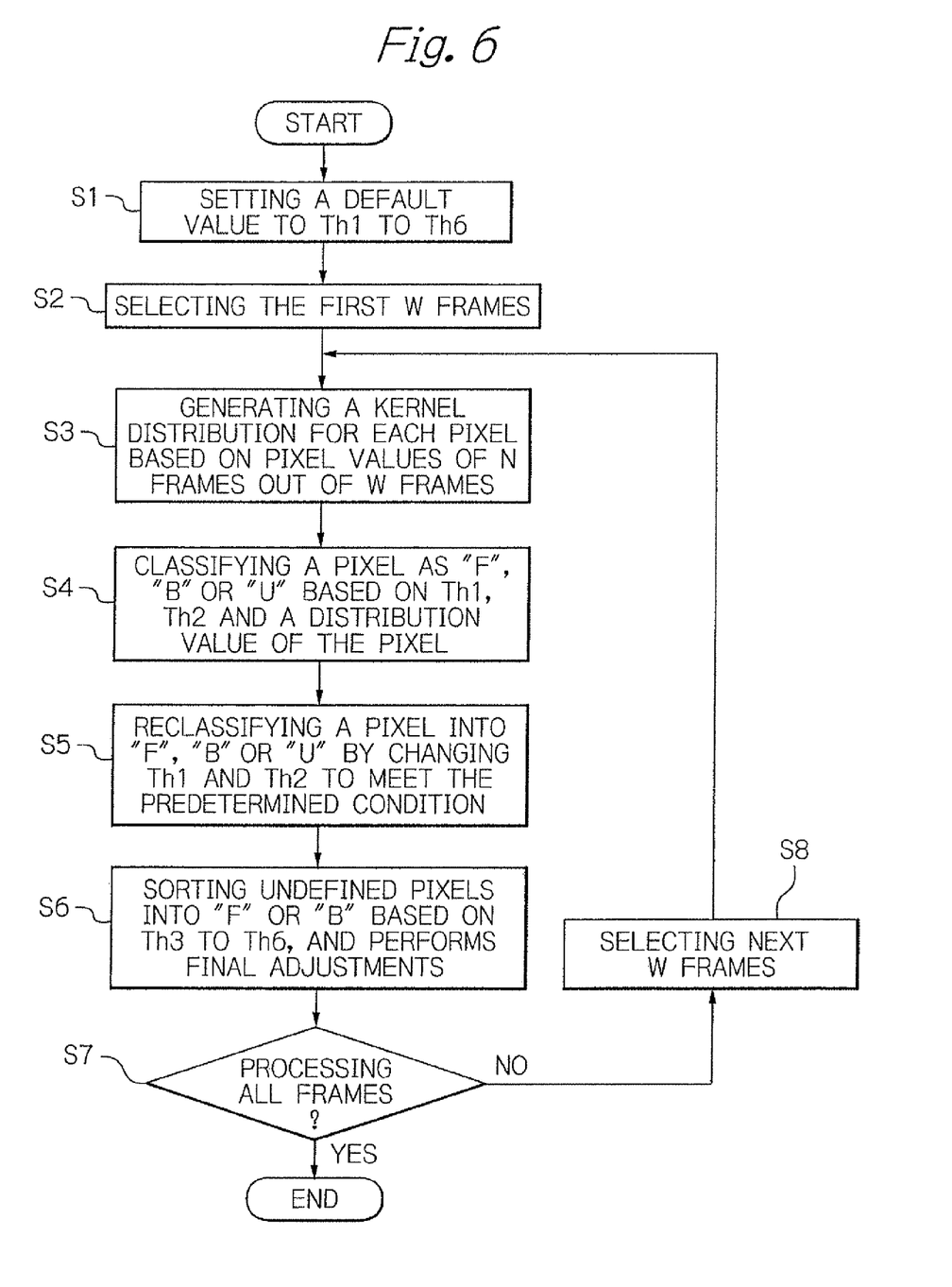
FIG. 6 is a flowchart representing an overall procedure of the invention.

FIG. 6 is a flowchart of an overall procedure according to the invention. In step S1, a default value is set to threshold values 1 to 6. Hereinafter threshold values 1 to 6 are referred as Th1 to Th6 respectively. Th1 and Th2 are used in the decision unit 4, and changed dynamically during processing. On the other hand, Th3 through Th6 are used in the adjustment unit 5, and not changed. In step S2, the buffer 2 reads out W frames to be processed from the storage unit 1. In step S3, the distribution generating unit 3 selects N frames out of W frames, and generates a kernel distribution of each pixel based on pixel values of selected N frames. The kernel distribution is a function of pixel values corresponding to red, green and blue respectively, and a distribution value, which represents an occurrence probability of a pixel value, is obtained by substituting the pixel value to the kernel distribution. The generation of the kernel distribution is described later in detail.

In step S4, the decision unit 4 classifies each pixel as a foreground pixel (F), a background pixel (B) or an undefined pixel (U) using Th1, Th2 and a distribution value of the pixel obtained by the kernel distribution. In step S5, the decision unit 4 divides each frame into blocks, counting the number of foreground pixels and undefined pixels of each block, and calculating variations of the number of foreground pixels and undefined pixels between adjacent frames for each block, and generates allowable ranges for each block based on variations of the number. The decision unit 4 changes Th1 and Th2 based on allowable ranges, and reclassifies each pixel using updated Th1 and Th2. The reclassification is described later in detail.

In step S6, the adjustment unit 5 sorts undefined pixels into background or foreground using Th3 through Th6, performs final adjustment, and then outputs the final classification result of W frames to the storage unit 1. Thereafter, steps S3 to S6 are repeated until all frames are processed (Steps S7 and S8). Hereinafter, each process in FIG. 6 is described in detail.

Figure 2:
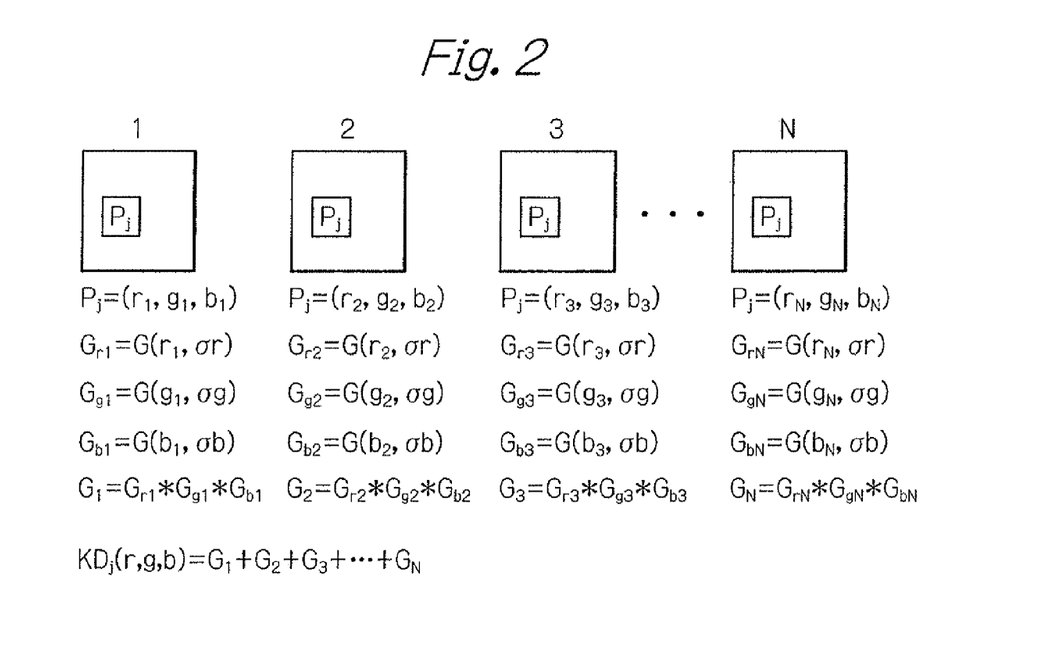
FIG. 2 is an explanation drawing of the generation of a kernel distribution.

First, the generation of the kernel distribution in the distribution generating unit 3 is explained. The distribution generating unit 3 selects N frames among W frames stored in the buffer 2 for generating the kernel distribution of each pixel. N frames are selected from the first N frames in W frames, but may be selected from the last N frames or from every other frame. Of course, all W frames may be utilized. FIG. 2 shows selected N frames, and a kernel distribution is generated for pixels of the same position of each frame. That is, when each frame has M pixels, M kernel distributions are generated.

Hereinafter, a description will be given of the generation of a kernel distribution for a j-th pixel $P_j$ of each frame. Referring to FIG. 2, pixel values (red, green, blue) of $P_j$ are $(r_1, g_1, b_1)$ for the first frame, $(r_2, g_2, b_2)$ for the second frame, $(r_3, g_3, b_3)$ for the third frame, and similarly $(r_N, g_N, b_N)$ for the N-th frame.

The distribution generating unit 3 calculates a difference of pixel value for each color between neighboring frames. Further the distribution generating unit 3 calculates a median value of all difference values for each color. That is, for red color, (N−1) difference values $dr_k$, where 1<=k<=N−1, are calculated as follows.

$$dr_1=|r_1-r_2|, dr_2=|r_2-r_3|, \ldots, dr_{N-1}=|r_{N-1}-r_N|$$

Then, a median value mr for red color is obtained from difference values $dr_1$ through $dr_{N-1}$. Similarly, a median value mg for green color and a median value mb for blue color are obtained.

A distribution of pixel values is generally assumed to be a Gaussian distribution, and a probability that a pixel value is larger than the median value is more than ¼. Therefore, standard deviations σr, σg and σb for red, green and blue colors are, respectively, estimated by following equations.

$$\sigma r=mr/(0.68\times(2^{0.5}))$$

$$\sigma g=mg/(0.68\times(2^{0.5}))$$

$$\sigma b=mb/(0.68\times(2^{0.5}))$$

The distribution generating unit 3 generates a Gaussian distribution G (mean value, standard deviation) of the $P_j$ for each color for each frame. A standard deviation of a generated Gaussian distribution is σr, σg or σb, and a mean value of it is the red, green or blue pixel value of $P_j$ for each frame. Specifically, as shown in FIG. 2, since the pixel value of red color is $r_1$ in the first frame, a Gaussian distribution $G_{r1}=G(r_1, \sigma r)$ is generated. Similarly, a Gaussian distribution $G_{g1}=G(r_1, \sigma g)$ and a Gaussian distribution $G_{b1}=G(r_1, \sigma b)$ are generated for green and blue colors, respectively. By similarly calculating for the second frame through N-th frame, the distribution generating unit 3 generates 3×N Gaussian distributions in total.

Thereafter, the distribution generating unit 3 generates a kernel distribution for a group of j-th pixel of each frame, by calculating a product of Gaussian distributions of three colors in the same frame, and adds all products of N frames. More specifically, for the first frame, a product $G_1=G_{r1}\times G_{g1}\times G_{b1}$ is calculated, and similarly $G_2$ through $G_N$ are calculated for the second through N-th frame, respectively. Then, the kernel distribution for a group of j-th pixels $KD_j(r, g, b)$ is calculated as follows.

$$KD_j(r,g,b)=(1/N)(G_1+G_2+\ldots+G_N)$$

It is possible to use other distributions, for example, Laplace distribution, Rectangle distribution, Triangular distribution, Polynomial distribution to generate a kernel distribution.

The distribution generating unit 3 obtains a distribution value of the j-th pixel in each frame by substituting the pixel value of the j-th pixel to the kernel distribution. For example, a distribution value of the pixel $P_j$ in the first frame is $KD(r_1, g_1, b_1)$, a distribution value of the pixel $P_j$ in the second frame is $KD(r_2, g_2, b_2)$, and a distribution value of the pixel $P_j$ in the N-th frame is $KD(r_N, g_N, b_N)$.

Figure 7:
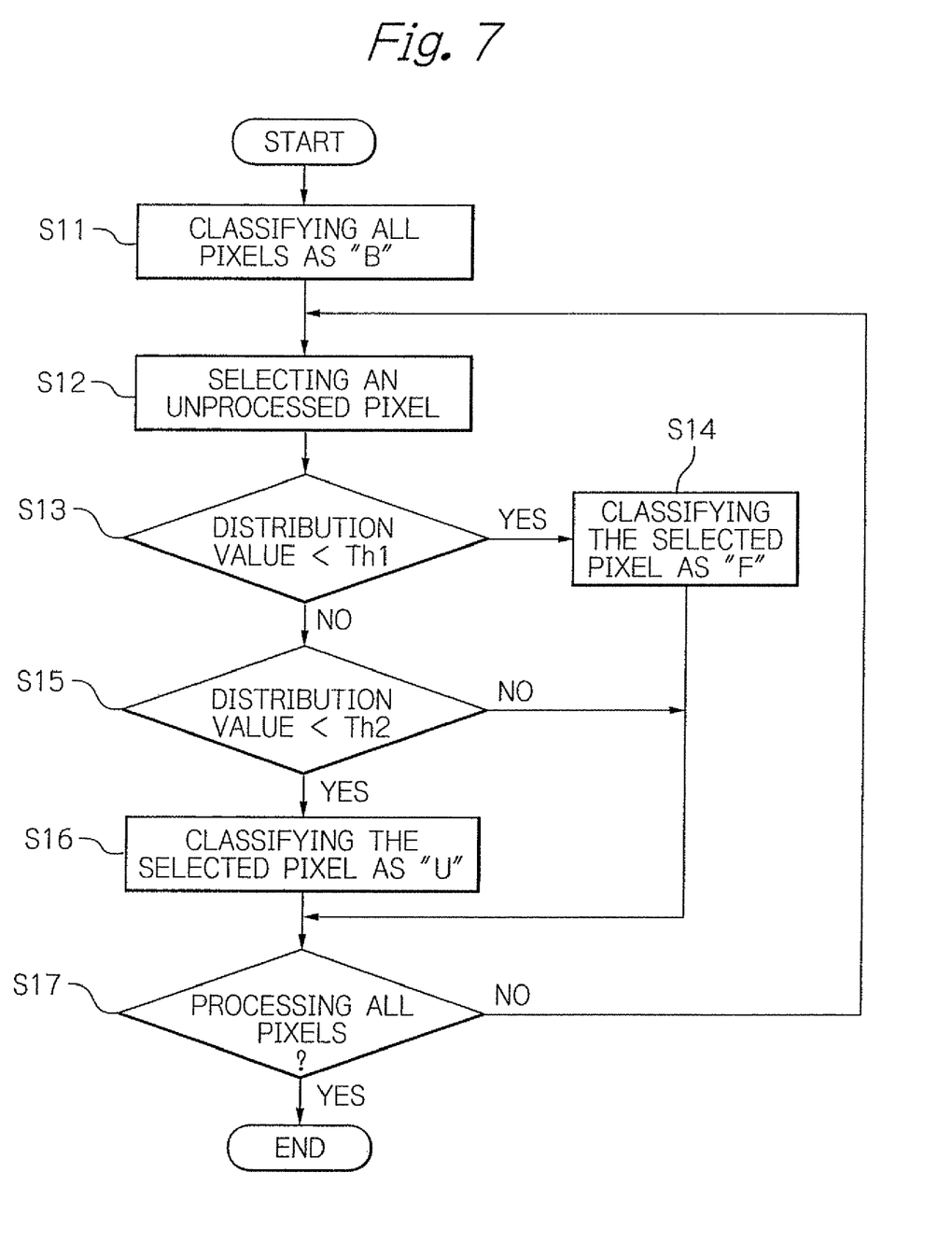
FIG. 7 is a flowchart of classifying pixels.

Next, the determination of a pixel type by the decision unit 4 is explained. The decision unit 4 classifies a pixel as foreground, background or undefined using Th1, Th2 and a distribution value of the pixel. FIG. 7 is a flowchart of the classification of pixels. In step S11, all pixels of an object frame are temporarily classified as background pixels. In step S12, an unprocessed pixel is selected. In step S13, the distribution value of the selected pixel is compared with Th1. If the distribution value is less than Th1, then the pixel is classified as a foreground pixel in step S14. If the distribution value is equal to or more than Th1, then the distribution value is compared with Th2 in step S15. If the distribution value is less than Th2, then the pixel is classified as an undefined pixel in step S16. The above steps are repeated until all pixels are processed (Step S17).

As apparent from the generation of the kernel distribution, the distribution value becomes high when similar pixel values are appeared for pixels in the same position of frames, and the distribution value becomes low when pixel values of pixels in the same position are varied a lot over N frames. Therefore, a pixel having a distribution value larger than Th2 is determined to correspond to a fixed object, i.e. background, and a pixel having a distribution value smaller than Th1 is determined to correspond to a moving object, i.e. foreground. On the contrary, a pixel having a distribution value between Th1 and Th2 is determined to be an undefined pixel at this stage.

However, Th1 and Th2 are to be adjusted properly for every moving picture, and therefore the decision unit 4 adaptively changes Th1 and Th2 based on the above classification result, and reclassifies each pixel. For this reason, the decision unit 4 divides each frame into blocks, and generates two allowable ranges $F_{allow}$ and $U_{allow}$ for each block. Hereinafter, the calculation of two allowable ranges, $F_{allow}$ and $U_{allow}$, is explained.

Figure 3:
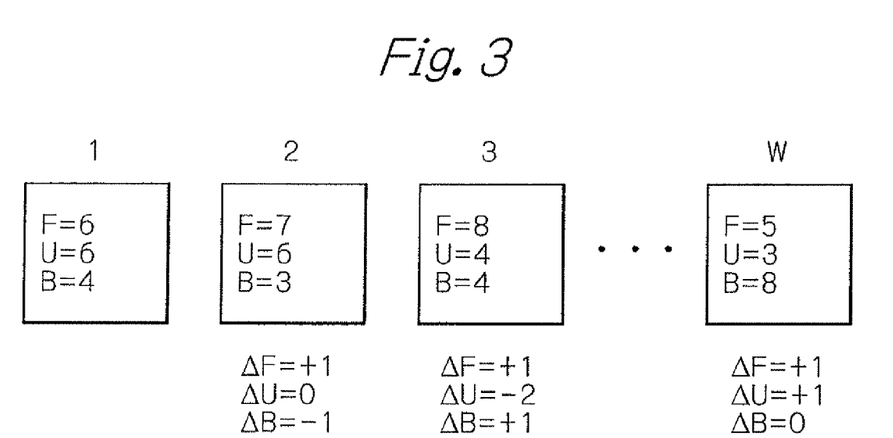
FIG. 3 is an explanation drawing of the calculation of allowable ranges.
Figure 8:
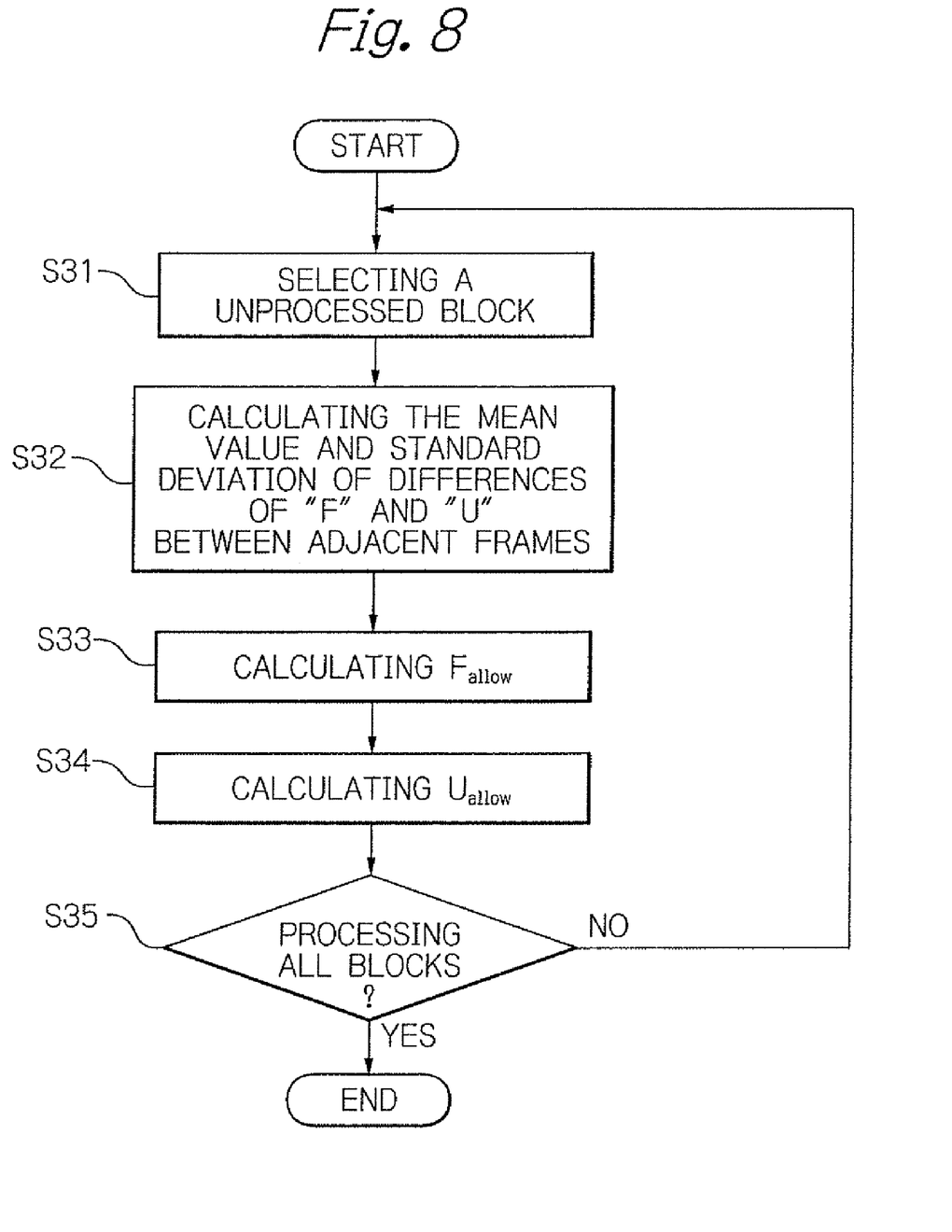
FIG. 8 is a flowchart of calculating allowable ranges.

FIG. 8 is a flowchart of the calculation of allowable ranges, and FIG. 3 is an explanation drawing of the calculation of allowable ranges. In FIG. 3, it is assumed that one block has 16 pixels. According to FIG. 3, 6 pixels are classified as foreground, 6 pixels are classified as undefined, and 4 pixels are classified as background in the first frame. 7 pixels are classified as foreground, 6 pixels are classified as undefined, and 3 pixels are classified as background in the second frame. 8 pixels are classified as foreground, 4 pixels are classified as undefined, and 4 pixels are classified as background in the third frame. 5 pixels are classified as foreground, 3 pixels are classified as undefined, and 8 pixels are classified as background in the W-th frame.

In step S31, the decision unit 4 selects a block to be processed. In step S32, the decision unit 4 calculates a difference ΔF of foreground pixels between adjacent frames, and a difference ΔU of undefined pixels between adjacent frames. Then it calculates a mean value MF and a standard deviation sF of (W−1) differences ΔF, and a mean value MU and a standard deviation sU of (W−1) differences ΔU. In steps S33 and S34, allowable ranges $F_{allow}$ and $U_{allow}$ are calculated using following equations with a predetermined coefficient a, where $$0<=a<=1.$$

$$MF-a\times sF<=F_{allow}<=MF+a\times sF$$

$$MU-a\times sU<=U_{allow}<=MU+a\times sU$$

Above steps are repeated until all blocks are processed (Step S35).

Next, the reclassification by the decision unit 4 for the second frame to W-th frame using allowable ranges $F_{allow}$ and $U_{allow}$ for each block is explained. Here, a description will be given assuming that default Th1 and Th2, which are used for classifying all pixels of W frames, is 0.2 and 0.4, $F_{allow}$ is from −1 to 1, and $U_{allow}$ is from −1 to 0.

As shown in FIG. 3, the foreground pixel difference ΔF from the first frame to the second frame is +1, which is within $F_{allow}$. Similarly, the undefined pixel difference ΔU from the first frame to the second frame is 0, which is within $U_{allow}$.

Accordingly, Th1 and Th2 for the block in the second frame are not changed. Therefore the classification of pixels for the block in the second frame is not changed.

Further, the foreground pixel difference ΔF from the second frame to the third frame is +1, which is within $F_{allow}$. However, the undefined pixel difference ΔU from the second frame to the third frame is −2, which is not within $U_{allow}$. To keep ΔU within $U_{allow}$, it is required to increase Th2. The unit to be increased is decided in advance, and in this example, the value of Th2 is increased from 0.4 to 0.5. Because Th2 is updated, all pixels of the block in the third frame are reclassified according to the procedure shown in FIG. 7 based on new threshold values. Then it is checked again whether differences ΔF and ΔU from the second frame to the third frame are within allowable ranges $F_{allow}$ and $U_{allow}$, respectively.

Figure 4:
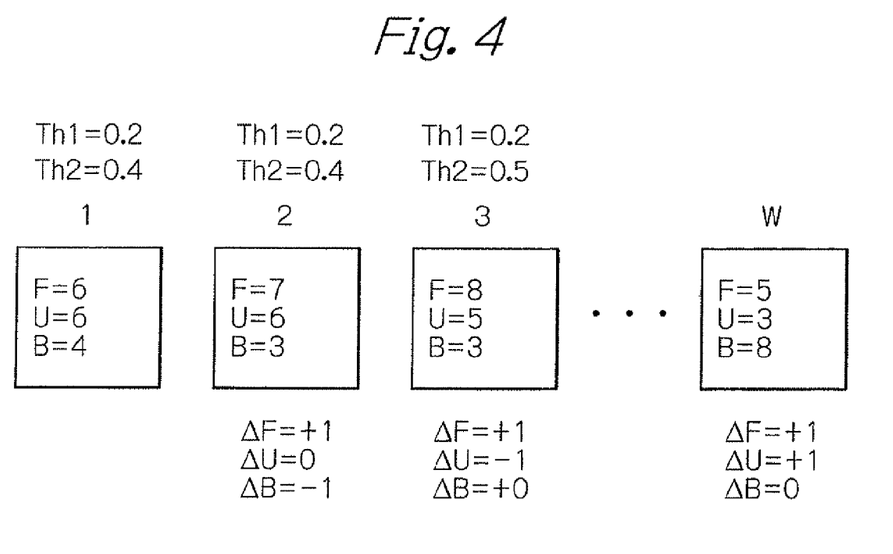
FIG. 4 is an explanation drawing of the reclassification of pixels.

FIG. 4 shows a state after reclassification of pixels in the third frame based on new threshold values. Using new threshold values, 8 pixels are classified as foreground, 5 pixels are classified as undefined, and 3 pixels are classified as background in the third frame, and differences ΔF and ΔU are +1 and −1, respectively, which are within allowable ranges. Therefore, the reclassification for the third frame ends at this stage. If both differences ΔF and ΔU are not within allowable ranges, threshold values are further updated.

Thereafter, pixels of the block in the fourth frame are also reclassified using new threshold values, and differences ΔF and ΔU of the fourth frame from the third frame are calculated. If both differences are within allowable ranges $F_{allow}$ and $U_{allow}$, respectively, the classification of the fourth frame is unchanged, and if not, threshold values are further updated. The same processing as above is executed up to the W-th frame.

In the above example, Th2 is increased because ΔU is less than the lower limit. If ΔU is more than the upper limit, Th2 is decreased. If ΔF is less than the lower limit, Th1 is increased, and if ΔF is more than the upper limit, Th1 is decreased. In the embodiment, differences of foreground pixels and undefined pixels are used, however, it is possible to use differences of foreground pixels and background pixels or differences of undefined pixels and background pixels. Further, FIGS. 3 and 4 shows a rectangular block. However, other shape, for example circle or hexagonal shape, can be applied to the block.

Figure 9:
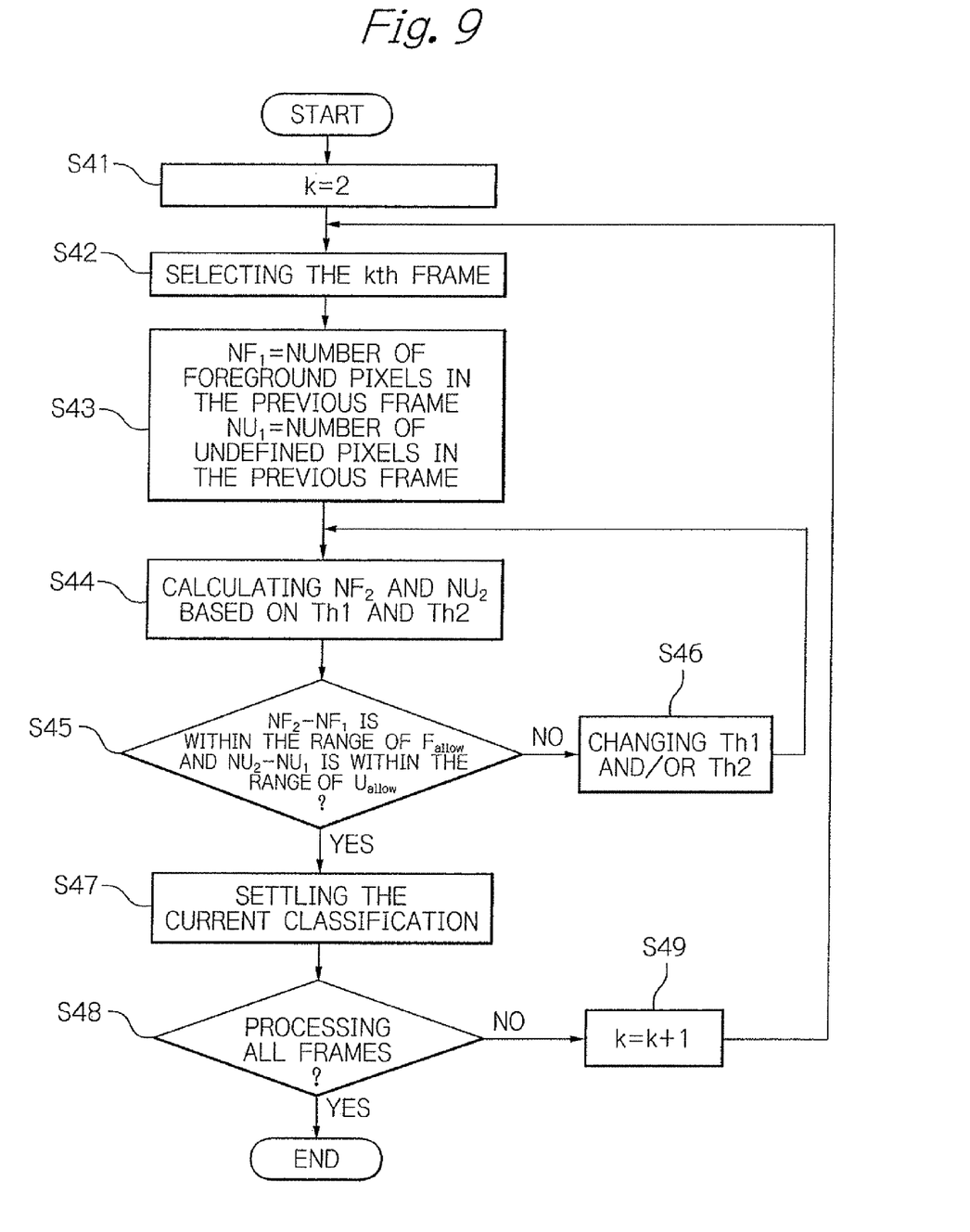
FIG. 9 is a flowchart of reclassifying pixels.

FIG. 9 is a flowchart of reclassifying pixels. In step S41, the decision unit 4 sets a frame number to 2. In step S42, it selects a frame to be processed, and set the number of foreground pixels and undefined pixels of the block to be processed in the previous frame to $NF_1$ and $NU_1$ in step S43. In step S44, the decision unit 4 sets the number of foreground pixels and undefined pixels of the block to be processed in the selected frame to $NF_2$ and $NU_2$, which are classified using current Th1 and Th2. In step S45, the decision unit 4 determines whether the value $NF_2-NF_1$ is within $F_{allow}$, and the value $NU_2-NU_1$ is within $U_{allow}$. If both differences are within respective allowable ranges, then the present classification is settled in step S47. If the selected frame is not the last frame, the next frame is selected and processed (Steps S48 and S49). If either difference is not within a respective allowable range, then Th1 and/or Th2 are updated in step S46, and steps S44 and S45 are repeated until both differences fall within a respective allowable range. The above steps are performed for each block.

As described above, the decision unit 4 adaptively adjusts threshold values based on differences of the number of pixel type between adjacent frames, reclassifies pixels using updated threshold values, and outputs classification result to the adjustment unit 5 as classification information.

Next, sorting of undefined pixels into foreground pixels or background pixels and final adjustment are explained. The sorting and adjustment are carried out for each frame by three processes named the first adjusting process, the second adjusting process and the third adjusting process.

Figure 10:
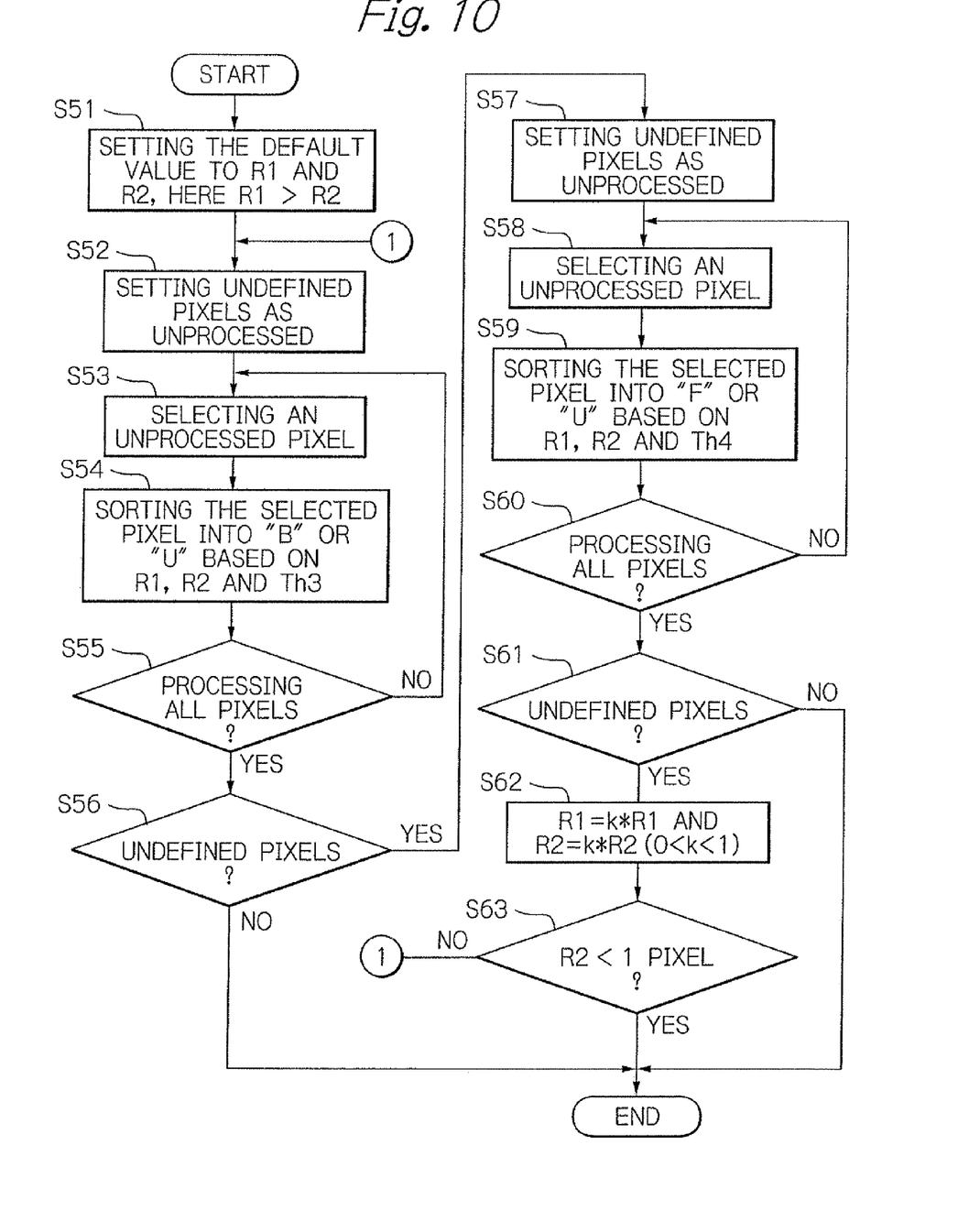
FIG. 10 is a flowchart of a first adjusting process in an adjustment unit.

FIG. 10 is a flowchart of the first adjusting process in the adjustment unit 5. In step S51, default values are set to radiuses R1 and R2, where R1>R2. In step S52, all undefined pixels in a frame to be processed are set to unprocessed. In step S53, an unprocessed pixel is selected and in step S54, the selected pixel is sorted into a background pixel or an undefined pixel. In more detail, in case a predetermined condition is satisfied, the selected pixel is sorted into a background pixel, and in case it is not satisfied, the selected pixel remains the undefined pixel.

Figure 5:
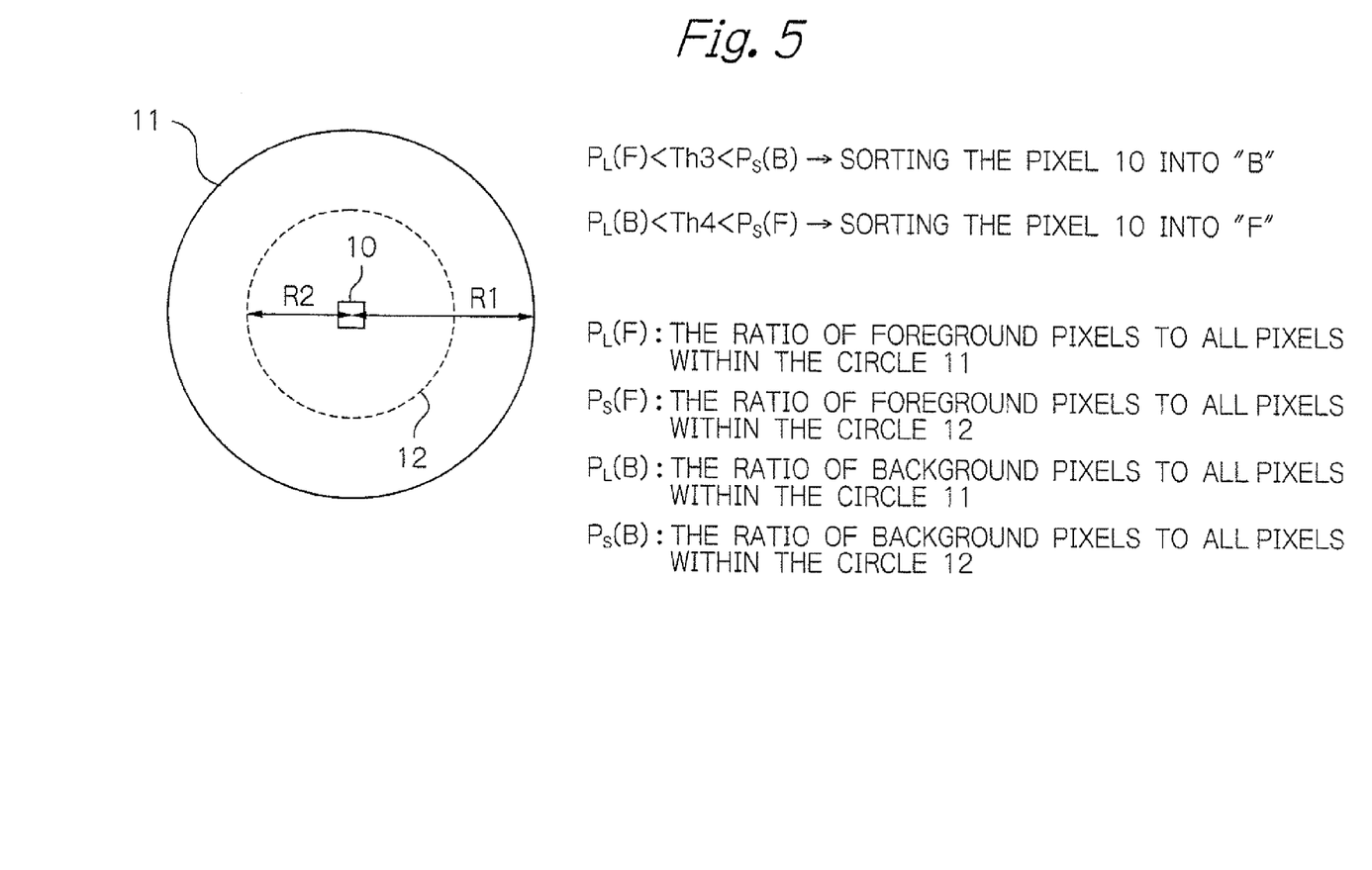
FIG. 5 is an explanation drawing of the process in a decision unit.

FIG. 5 is an explanation drawing of the sorting in step S54. Firstly, a ratio $P_L(F)$ of foreground pixels to all pixels within a circle 11 and a ratio $P_S(B)$ of background pixels to all pixels within a circle 12 are calculated. Here, the radius of the circle 11 is R1, the radius of the circle 12 is R2, and the center of both the circles 11 and 12 are located at the selected pixel 10 as shown in FIG. 5. In case of $P_L(F)<Th3<P_S(B)$, the selected pixel 10 is changed to a background pixel, otherwise it is kept as an undefined pixel. That is, when the number of foreground pixels within a certain region having the selected pixel 10 at the center is relatively small and foreground pixels are not concentrated near the selected pixel 10, the selected pixel 10 is determined to be a background pixel. In other words, based on the number of foreground pixels and background pixels and their distributions, it is determined that the selected pixel 10 is to be a background pixel or to remain an undefined pixel. Therefore, a relatively small value, for example 10%, is used for Th3, and this value is experientially decided in advance.

Step S54 is executed on each undefined pixel in the frame one by one, and when all undefined pixels are processed (Step S55), it is determined whether undefined pixels still exist or not in step S56. If an undefined pixel does not exist, the first adjusting process ends. On the other hand, if there is at least one pixel classified as undefined, all undefined pixels are set as unprocessed in step S57. In step S58, an unprocessed pixel is selected, and the selected pixel is sorted into a foreground pixel or an undefined pixel in step S59.

Similarly to the sorting into a background pixel or an undefined pixel in step S54, a ratio $P_L(B)$ of background pixels to all pixels within the circle 11 and a ratio $P_S(F)$ of foreground pixels to all pixels within the circle 12 are calculated firstly. Then the selected pixel 10 is changed to a foreground pixel in case of $P_L(B)<Th4<P_S(F)$, otherwise it is kept as an undefined pixel. Here, Th3 and Th4 may be one threshold value without discrimination.

Step S59 is executed on each undefined pixel in the frame one by one, and when the all undefined pixels are processed (Step S60), it is determined whether undefined pixels still exist or not in step S61. If an undefined pixel does not exist, the first adjusting process ends. On the other hand, if there is at least one pixel classified as undefined, the radius R1 and radius R2 are reduced by a predetermined ratio in step S62. If the value of R2 after reduction is smaller than one pixel distance, the first adjusting process ends. Otherwise, steps from S52 are repeated again using reduced R1 and R2 (Step S63).

Figure 11:
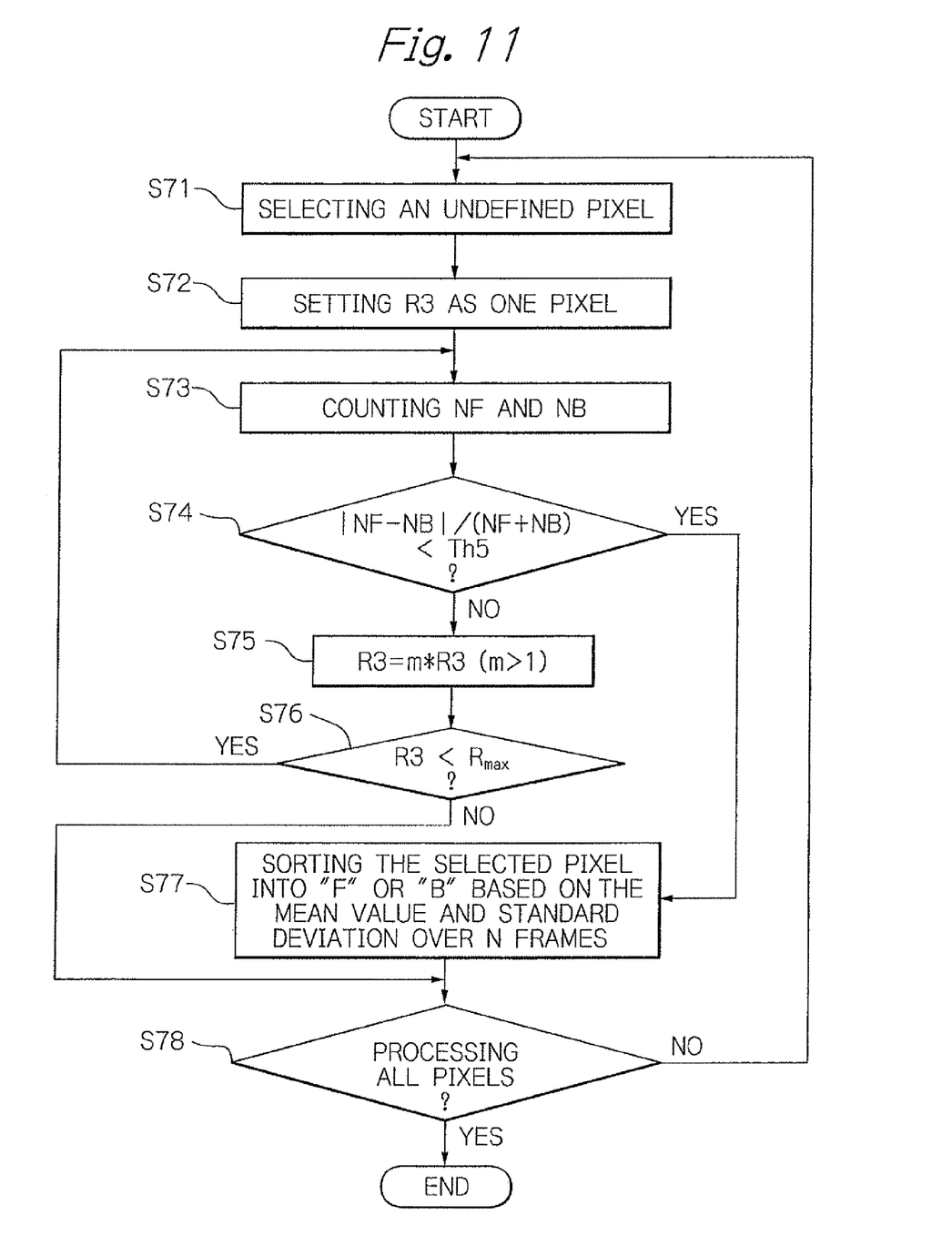
FIG. 11 is a flowchart of a second adjusting process in the adjustment unit.

Next, second adjusting process is explained. FIG. 11 is a flowchart of the second adjusting process in the adjustment unit 5. In step S71, one unprocessed pixel is selected from undefined pixels. In step S72, a radius R3 is set to one pixel distance, In step S73, the number of foreground pixels NF and the number of background pixels NB in a circle, which has the radius equal to R3 with the selected pixel at the center, are calculated. In step S74, an absolute value of a difference between NF and NB is divided by the sum of NF and NB, and the divided value is compared with Th5. If the divided value is equal to or more than Th5, the radius R3 is increased by a predetermined ratio until the divided value becomes less than Th5. However, in order to prevent the circle from being too big such that the correlation between pixels inside the circle becomes too low, the maximum value $R_{max}$ of the radius R3 is defined in advance, and when R3 exceeds the $R_{max}$, the selected pixel is kept as an undefined pixel (Step S76). When the divided value has become less than Th5, the selected pixel is sorted into a foreground pixel or a background pixel based on a mean value and a standard deviation of pixel values inside the circle over N frames in step S77.

The accuracy of the sorting at step S77 becomes better as the difference between foreground pixels and background pixels in the circle with the radius of R3 becomes smaller. To minimize the difference between foreground pixels and background pixels, steps S74 through S76 are performed. Therefore, a relatively small value, for example, 10% is used for Th5, and this value is experientially decided in advance. Hereinafter, the sorting at step S77 is explained in detail.

First, the adjustment unit 5 calculates following four values.

$$D(\mu,B)=\Sigma d_{pB}^2|\mu_{pB}-\mu_U|^2 \quad (1)$$

$$D(\sigma,B)=\Sigma d_{pB}^2|\mu_{pB}-\sigma_U|^2 \quad (2)$$

$$D(\mu,F)=\Sigma d_{qF}^2|\mu_{qF}-\mu_U|^2 \quad (3)$$

$$D(\sigma,F)=\Sigma d_{qF}^2|\sigma_{qF}-\sigma_U|^2 \quad (4)$$

Here, $\mu_U$ and $\sigma_U$ are a mean value and a standard deviation of pixel values of the selected pixel over N frames, $\mu_{pB}$ and $\mu_{pB}$ are a mean value and a standard deviation of pixel values of background pixels p in the circle with the radius equal to R3 over N frames, $\mu_{qF}$ and $\sigma_{qF}$ are a mean value and a standard deviation of pixel values of foreground pixels q in the circle with the radius equal to R3 over N frames, $d_{pB}$ is a physical distance between background pixels p and the selected pixel, and $d_{qF}$ is a physical distance between foreground pixels q and the selected pixel. In equations (1) and (2), Σ means to sum up a value regarding as each background pixel in the circle with the radius equal to R3, and in equations (3) and (4), Σ means to sum up a value regarding as each foreground pixel in the circle with the radius equal to R3. In the embodiment, N frames are the same frames as used in the generation of the kernel distribution, but different frames may be used, and further the number of frames may not be N.

The portion of an absolute value in each equation above represents a statistical distance. That is, equations (1) to (4) represent the sum of product of the physical distance from the selected pixel and the statistical distance about foreground pixels and background pixels. The adjustment unit 5 sorts the selected pixel into a foreground pixel, in case $D(\mu, F)<D(\mu, B)$ and $D(\sigma, F)<D(\sigma, B)$ are satisfied. This is because the selected pixel is closer to foreground pixels with respect to both the mean value and the standard deviation. On the contrary, the adjustment unit 5 sorts the selected pixel into a background pixel, in case $D(\mu, F)>D(\mu, B)$ and $D(\sigma, F)>D(\sigma, B)$ are satisfied.

If both conditions are not satisfied, the adjustment unit 5 compares the value of $D(\mu, F)+D(\sigma, F)$ with the value of $D(\mu, B)+D(\sigma, B)$. If the value of $D(\mu, F)+D(\sigma, F)$ is smaller, the selected pixel is sorted into a foreground pixel, otherwise into a background pixel.

The second adjusting process ends, when the adjustment unit 5 processes all undefined pixels.

Lastly, the third adjusting process by the adjustment unit 5 is explained. The adjustment unit 5 sorts all undefined pixels into foreground pixels first. Then the adjustment unit 5 selects one foreground pixel, and calculates a ratio of background pixels to all pixels within a circle, which is centered at the selected foreground pixel and has a radius equal to R4. Then, the adjustment unit 5 compares the ratio of background pixels with Th6. In case the ratio is more than Th6, the adjustment unit 5 sorts the selected foreground pixel into a background pixel. After all foreground pixels are processed accordingly, the adjustment unit 5 executes reverse process on all background pixels. That is, the adjustment unit 5 selects one background pixel, calculates a ratio of foreground pixels to all pixels within a circle, which is centered at the selected background pixel has a radius equal to R4, and compares the ratio of foreground pixels with Th6. In case the ratio is more than Th6, the adjustment unit 5 sorts the selected background pixel into a foreground pixel.

The third adjusting process is to correct a state such that, for example, one or a few foreground pixels are surrounded with many background pixels. Therefore, a relatively high value is used for Th6, for example 90%, and the value is experientially decided in advance. In the embodiment, all undefined pixels are changed to foreground pixels first, but it is possible to change to background pixels.

In the first, second and third adjusting process, circles are used for sorting and adjustment. However, it is possible to use other shape, like rectangle or hexagonal.

As described above, pixels, which are difficult to classify as foreground or background using two threshold values Th1 and Th2, are temporarily determined to be undefined pixels. These undefined pixels are sorted into a foreground pixel or a background pixel based on a sorted result and the distribution of pixels in a certain area with the undefined pixel at the center, and further based on the statistical distance of the pixel value and the physical distance. Moreover, Th1 and Th2 are reviewed and updated based on a classification result using Th1 and Th2, and reclassification is performed using updated Th1 and Th2. With these processes, pixels in each frame can be sorted into a foreground or background more accurately than conventional techniques.

Many modifications and variations will be apparent those of ordinary skilled in the art. The embodiments was chosen and described in order to best explain the principles of the invention. It should be understood that the present invention is not limited to the specific embodiments described in the specification, except as defined in the appended claims.

For example, the invention may be achieved by a program product, which realizes the functions of the above embodiments. Programs defining functions on the invention can be delivered to a computer system using computer readable storage media or via network. It should be understood the invention may be implemented by software, hardware or a combination of software and hardware.

The invention claimed is:
1. An apparatus for classifying pixels in each frame of a motion picture as foreground or background comprising:
   distribution generating means for generating a distribution value for a pixel representing an occurrence probability of a pixel value of the pixel based on pixel values of pixels located at the same position in each frame as the pixel;

decision means for classifying a pixel as a foreground pixel, a background pixel or an undefined pixel based on a first threshold, a second threshold and the distribution value of the pixel; and adjustment means for sorting each pixel into a foreground pixel or a background pixel based on the classification result of the decision means, wherein the decision means classifies pixels of each frame based on the first and second thresholds as foreground, background or undefined, divides each frame into blocks, calculates differences of the number of pixels in the same class in a block between adjacent frames, updates the first and/or second thresholds for the block based on the differences, and reclassifies pixels in the block when the first and/or second thresholds for the block are updated.

2. The apparatus according to claim 1, wherein the decision means calculates mean values and standard deviations of differences of the number of a first and a second pixels in a block between adjacent frames, calculates a first and a second allowable ranges for the block based on the calculated mean values and the standard deviations, and updating the first and/or second thresholds for the block in case the difference of the first pixel in the block from a previous frame is not within the first allowable range or the difference of the second pixel in the block from a previous frame is not within the second allowable range, wherein the first and second pixels are foreground pixels, background pixels or undefined pixels.

3. The apparatus according to claim 1, wherein the adjustment means sorts an undefined pixel into foreground, background or undefined based on the number of foreground pixels and background pixels in a region centered at the undefined pixel as well as a distributions of foreground pixels and background pixels in the region, and repeats the sorting by changing the size of the region.

4. The apparatus according to claim 1, wherein the adjustment means determines a region, in which a ratio of a difference between foreground pixels and background pixels to a sum of foreground pixels and background pixels is less than a third threshold, and sorts an undefined pixel into foreground, background or undefined based on a mean value and a standard deviation of pixel values of the undefined pixel over frames, a mean value and a standard deviation of pixel values of foreground pixels in the region over the frames, a mean value and a standard deviation of pixel values of background pixels in the region over the frames, a physical distance between the undefined pixel and foreground pixels in the region and a physical distance between the undefined pixel and background pixels in the region.

5. The apparatus according to claim 1, wherein the adjustment means changes undefined pixels to foreground pixels or background pixels, changes a foreground pixel to a background pixel if a ratio of the number of background pixels to all pixels in a region including the foreground pixel is more than a fourth threshold, and changes a background pixel to a foreground pixel if a ratio of the number of foreground pixels to all pixels in a region including the background pixel is more than the fourth threshold.

6. The apparatus according to claim 1, wherein the distribution generating means determines a standard deviation of a group of pixels, each of which is located at the same position of frames, based on pixel values of the group of pixels, generates a distribution corresponding to a pixel of the group, where a standard deviation of the distribution is equal to the determined standard deviation of the group of pixels and a mean value of the distribution is equal to a pixel value of a corresponding pixel, and generates a kernel distribution for the group by summing up each distribution corresponding to a pixel of the group, wherein the distribution value for a pixel of the group is generated by substituting a pixel value of the pixel of the group to the kernel distribution for the group.

7. A method for classifying pixels in each frame of a motion picture as foreground or background, comprising the steps of:

generating a distribution value for a pixel representing an occurrence probability of a pixel value of the pixel based on pixel values of pixels located at the same position in each frame as the pixel;

classifying a pixel as a foreground pixel, a background pixel or an undefined pixel based on a first threshold, a second threshold and the distribution value of the pixel; and sorting each pixel into a foreground pixel or a background pixel based on the classification result of the classifying step, wherein the classifying steps comprise the steps of:

classifying pixels of each frame based on the first and second thresholds as foreground, background or undefined, updating the first and/or second thresholds based on the classification result, and reclassifying pixels based on the updated first and second thresholds.

8. A non-transitory computer readable storage medium storing a computer program that if executed causes a computer to perform the method of claim 7.

* * * * *